United States Patent [19]

Lindberg

[11] Patent Number: 4,468,338

[45] Date of Patent: Aug. 28, 1984

[54] TRANSPARENT SOAP COMPOSITION

[75] Inventor: Gordon A. Lindberg, Fullerton, Calif.

[73] Assignee: Purex Corporation, Lakewood, Calif.

[21] Appl. No.: 503,740

[22] Filed: Jun. 13, 1983

[51] Int. Cl.[3] ........................ C09K 15/02; C09K 15/06; C11D 9/10; C11D 17/00

[52] U.S. Cl. .................................... 252/105; 252/108; 252/117; 252/118; 252/122; 252/132; 252/133; 252/134; 252/368; 252/397; 252/407; 252/DIG. 16; 252/400 R; 260/398.5

[58] Field of Search ............... 252/105, 108, 117, 118, 252/122, 132, 134, 174, 368, 397, 407, DIG. 16; 260/398.5

[56] References Cited

U.S. PATENT DOCUMENTS

| | | | |
|---|---|---|---|
| 2,820,768 | 1/1958 | Fromont | 252/118 |
| 2,826,478 | 3/1958 | Schucker | 252/105 X |
| 2,921,907 | 1/1960 | Kleyn | 252/107 |
| 2,971,917 | 2/1961 | Fusco | 252/107 |
| 3,076,766 | 2/1963 | Ansteff | 252/117 |
| 3,155,624 | 11/1964 | Kelly | 252/122 |
| 3,503,885 | 3/1970 | Wedell | 252/105 |
| 3,793,214 | 2/1974 | O'Neill | 252/117 |
| 3,855,150 | 12/1974 | Weris | 252/404 |
| 3,926,828 | 12/1975 | O'Neill | 252/117 |
| 3,969,259 | 7/1976 | Lages | 252/107 |
| 4,138,352 | 2/1979 | Teot et al. | 252/135 |
| 4,290,904 | 9/1981 | Poper | 252/118 |
| 4,292,192 | 9/1981 | Hooper | 252/132 |
| 4,297,230 | 10/1981 | Rasser | 252/117 |
| 4,298,491 | 11/1981 | Coxon | 252/95 |
| 4,303,542 | 12/1981 | Heinlein | 252/91 |

*Primary Examiner*—Dennis L. Albrecht
*Attorney, Agent, or Firm*—William W. Haefliger

[57] ABSTRACT

A transparent soap composition, consisting essentially of (a) over 50% by weight of a complex mixture of the sodium and triethanolamine salts of a fatty acid or acids having from 6 to 18 carbon atoms and an iodine value of 8–15, (b) between 0.2 and 1.0 weight percent of a member or members selected from the group consisting of citric acid, sodium citrate and potassium citrate, (c) between 0.2 and 0.1 weight percent of a member or members selected from the group consisting of sodium metabisulfite, sodium sulfite, sodium bisulfite, potassium bisulfite, sodium hydrosulfite, potassium hydrosulfite and potassium sulfite, and potassium metabisulfite, (d) water.

14 Claims, No Drawings

TRANSPARENT SOAP COMPOSITION

BACKGROUND OF THE INVENTION

This invention relates generally to soap compositions, and more particularly to bar soap compositions characterized by transparency retention for long time intervals.

Transparent bar soap is a highly desirable and commercially attractive product; however, such soaps have in the past been unable to retain desired transparency due to progressive darkening with age, as for example, six months to three or four years.

It is a major object of the present invention to provide a highly desirable soap composition which does not lose its transparency, or otherwise darken, over extended time periods.

DETAILED DESCRIPTION

In accordance with the invention, the addition of small weight percentages of sodium metabisulfite and citric acid to a soap composition consisting of a complex mixture of sodium and triethanolamine salts of a fatty acid or acids having from 6 to 18 carbon atoms and an iodine value of 8–15, results in maintenance of long term transparency of the soap (for example in solid bar configuration). More specifically, between 0.2 and 1.0 weight percent of a member or members selected from the group consisting of citric acid, sodium citrate and potassium citrate is added to the soap mix; and between 0.2 ad 1.0 weight percent of a member or members selected from the group consisting of sodium metabisulfite, sodium sulfite, sodium bisulfite, potassium bisulfite, sodium hydrosulfite, potassium metabisulfite and potassium sulfite is also added to the mix.

Examples of the soap compositions are embodied in the following, wherein above range and below range soap characteristics are also listed;

TABLE I

| Ingredients | Range (wt. %) | Above Range | Below Range | Optimum (wt. %) |
|---|---|---|---|---|
| Triethanolamine | 30–35% | Hard, clear | Soft, opaque | 30.2% |
| Coconut fatty acid | 18–22 | Hard, hazy | Hard, very sl. hazy | 20.2 |
| Stearic acid | 15–21 | Hard, opaque | Hard, hazy | 20.2 |
| Sodium hydroxide | 4.5–6.5 | Sl. soft, hazy | Hard, hazy | 4.55 |
| Glycerine | 10–16 | Hard, clear | Hard, very sl. hazy | 12.1 |
| 50% gluconic acid | about 0.2 | | | 0.2 |
| Sodium metabisulfite | about 0.5 | | | 0.5 |
| Citric acid | | | | 0.5 |
| Perfume | | | | 1.0 |
| Deionized water | | | | 10.55 |

The actual soap portion of the formula consists of a complex mixture of the sodium and triethanolamine salts of coconut fatty acid and stearic fatty acid. Coconut fatty acid has the approximate composition of 5% caprylic acid, 4% capric acid, 52% lauric acid, 19% myristic acid, 9.5% palmitic acid, 2.5% stearic acid, 7% oleic acid and 1% linoleic acid. Other properties are a titre of 22°–26° C., an iodine value of 8–15, an acid value of 258–270 and a saponification value of 260–272. Stripped coconut fatty acid having less than 1% capric acid, 55% lauric acid, 24% myristic acid, 12.5% palmitic acid, 1.5% stearic acid, 5% oleic acid, and 1% linoleic acid is also usable.

Stearic acid used has the approximate composition 2.5% myristic acid, 0.5% pentadecanoic acid, 50% palmitic acid, 2% margaric acid, 35% stearic acid, 9% oleic acid and 1% linoleic acid. This is further characterized by a titre of 52.8°–53.5° C., an iodine value of 8–12, an acid value of 205–210 and a saponification value of 206–211. The stearic acid/coconut acid blend has the composition:

TABLE II

| | STEARIC (wt. %) | COCONUT (wt. %) | AVERAGE (wt. %) |
|---|---|---|---|
| Linoleic C 18 2 = | 1 | 1 | 1 |
| Oleic C 18 1 = | 9 | 7 | 8 |
| Stearic C 18 | 35 | 2.5 | 19 |
| Margaric C 17 | 2 | — | 1 |
| Palmitic C 16 | 50 | 9.5 | 30 |
| Pentadecanoic C 15 | 0.5 | — | 0.25 |
| Myristic C 14 | 25 | 19 | 11 |
| Lauric C 12 | — | 52 | 26 |
| Capric C 8 | — | 4 | 2 |
| Caprylic C 6 | — | 5 | 2.5 |

Other fatty acids having approximately the above compositions are usable, and particularly as respects the coconut fatty acid. Usable fatty acids are palm kernel fatty acid (as a replacement for coconut fatty acid), and particularly palm kernel fatty acid hydrogenated to an iodine value between 8 and 15; and high iodine value vegetable oils hydrogenated to approximately the above 'average' composition and to an iodine value between 8 and 15.

In the Table I formulation, glycerin imparts clarity to the soap and does not detract from its bar form hardness. Gluconic acid serves as a chelating agent for iron or its compounds which might be present in the raw materials or be transmitted from the production equipment. Normal material has no effect on the soap color. A very dark gluconic acid will darken the product very slightly. The triethanolamine in the formula acts as a buffer and reduces large fluctuations in pH. The optimum pH of a 1% solution of the soap in deionized or distilled water is 9.4. Using the maximum and minimum and minimum values of triethanolamine and NaOH, the following values were obtained for a 1% soap solution at room temperature:

TABLE III

| | pH |
|---|---|
| Triethanolamine Content | |
| 25.2% | 9.3 |
| 35.2% | 9.4 |
| NaoH Content | |
| 4% | 9.1 |
| 6% | 9.9 |

In order to determine the effectiveness of the discoloration preventing additives, samples of transparent soap with and without 0.5% $Na_2S_2O_5$ (sodium metabisulfite) and 0.5% citric acid were prepared and set up at 180° F., 120° F. and at room temperature. FAC color determinations were made. The following clarity values were observed:

TABLE IV

| | With $Na_2S_2O_5$ + Citric Acid | | | | Control | | | |
|---|---|---|---|---|---|---|---|---|
| Run No. | Initial | 180° F. 1 hr. | 180° F. 24 hrs. | 120° F. 7 days | Initial | 180° F. 1 hr. | 180° F. 24 hrs | 120° F. 7 days |
| 1 | 1 | 1 | 1 | 1 | 4 | 7 | 17 | 11 |
| 2 | 1 | 1 | 1 | 1 | 3 | 8 | 15 | 11 |
| 3 | 1 | 1 | 1 | 1 | 9 | 11 | 19 | 18 |
| 4 | 1 | 1 | 1 | 1 | 3 | 9 | 11 | 16 |
| 5 | 1 | 1 | 1 | 1 | 5 | 9 | 11 | 17 |

In the above, the number 1 indicates complete clarity, and higher numbers indicated progressive darkening.

FAC color determinations of certain transparent soap bars stored at room temperature, with sodium metabisulfite and citric acid contents as indicated below (and otherwise of the above Table I optimum formulation) are as follows:

TABLE IV

| | Initial | After 4 years |
|---|---|---|
| Production sample containing 0.5% $Na_2S_2O_5$ and 0.5% citric acid | 2 | 3 |
| | Initial | After 8 months |
| Production sample containing 0.5% $Na_2S_2O_5$ but without citric acid | 2 | Opaque 19+ |
| | Initial | After 5 years |
| Laboratory prepared samples with 0.5% $Na_2S_2O_5$ | | |
| With 0.5% citric acid | 2 | 7 |
| Without citric acid | 2 | 19+ |

Samples of transparent soap containing various levels of $Na_2S_2O_5$ and citric acid in increments of 0.1% were tested at 180° F. FAC values were determined after 1 day and after 7 days, and results were as follows:

TABLE VI

| $Na_2S_2O_5$ (wt. %) | Citric Acid (wt. %) | FAC 1 day | FAC 7 days |
|---|---|---|---|
| 0 | 0 | 11 | 19+ |
| 0 | 0.1 | 11B | 19+ |
| 0 | 0.2 | 15 | 19+ |
| 0 | 0.3 | 11B | 19+ |
| 0 | 0.4 | 15 | 19+ |
| 0 | 0.5 | 11B | 19+ |
| 0 | 0.6 | 11 | 19+ |
| 0.1 | 0 | 3 | 19+ |
| 0.1 | 0.1 | 2 | 19+ |
| 0.1 | 0.2 | 2 | 19+ |
| 0.1 | 0.3 | 3 | 19+ |
| 0.1 | 0.4 | 2 | 19+ |
| 0.1 | 0.5 | 1 | 19+ |

TABLE VI-continued

| $Na_2S_2O_5$ (wt. %) | Citric Acid (wt. %) | FAC 1 day | FAC 7 days |
|---|---|---|---|
| 0.1 | 0.6 | 2 | 19+ |
| 0.2 | 0 | 1 | 11 |
| 0.2 | 0.1 | 1 | 11C |
| 0.2 | 0.2 | 1 | 11C |
| 0.2 | 0.3 | 1 | 11C |
| 0.2 | 0.4 | 1 | 17 |
| 0.2 | 0.5 | 1 | 17 |
| 0.2 | 0.6 | 1 | 13 |

From the above, it is clear that the best results were obtained when both $Na_2S_2O_5$ (sodium metabisulfite) and citric acid weight percentages were about 0.5, in the composition designated optimum in TABLE I.

Examples of the perfume used in TABLE I are as follows:

1. International Flavors and Fragrances' Novelty #567.
2. International Flavors and Fragrances' Cantata R-2.
3. Firmenich Oil Compound 39.043/NY.
4. Naarden International's Citrus 72.
5. A blend of 49 fragrance components, the principal ones being geraniol, anistic aldehyde, benzyl acetate, musk xylol, phenyl ethyl alcohol, eugenol, linalyl acetate, alpha amyl cinnamic aldehyde, coumarin, and amyl salicylate.
6. A blend of components which includes citrol acetate, Citrogen K, Lemongrass Oil, and dimethyl acetal.

I claim:

1. A transparent soap composition characterized by improved stability against darkening and loss of transparency, consisting essentially of
   (a) over 50% by weight of a complex mixture of the sodium and triethanolamine salts of a fatty acid or acids having from 6 to 18 carbon atoms and an iodine value of 8–15,
   (b) between 0.1 and 1.0 weight percent of a member or members selected from the group consisting of citric acid, sodium citrate and potassium citrate,
   (c) between 0.3 and 1.0 weight percent of a member or members selected from the group consisting of sodium metabisulfite, and potassium metabisulfite, and
   (d) water,
   (e) the sum of the weight precentages of the (b) and (c) composition members being at least about 0.5 weight percent.
2. The soap of claim 1 having solid bar configuration.
3. The soap of claim 1 having transparent solid form.
4. The soap of claim 1 wherein said fatty acid is selected from the group consisting of coconut fatty acid and stearic acid.
5. The soap of claim 1 wherein said fatty acid consists of
   (i) between 18 and 22 weight percent coconut fatty acid, and (ii) between 15 and 21 weight percent stearic acid.

6. The soap of claim 1 wherein said fatty acid consists of (i) about 20.2 weight percent coconut fatty acid, and
(ii) about 20.2 weight percent stearic acid.

7. The soap of claim 5 wherein said composition includes between 10 and 16 weight percent glycerine.

8. The soap of claim 5 wherein the composition includes between 0.1 and 1.0 weight percent gluconic acid.

9. The soap of claim 5 wherein said composition includes about 0.2 weight percent of 50% gluconic acid.

10. The soap of claim 1 wherein said fatty acids include caprylic acid, capric acid, lauric acid, myristic acid, pentadecanoic acid, palmitic acid, margaric acid, stearic acid, oleic acid, and linoleic acid.

11. The soap of claim 10 wherein said fatty acids have the following relative weight percentages:

| | |
|---|---|
| caprylic | about 2.5 |
| capric | about 2.0 |
| lauric | about 26.0 |
| myristic | about 11.0 |
| pentadecanoic | about 0.25 |
| palmitic | about 30.0 |
| margaric | about 1.0 |
| stearic | about 19.0 |
| oleic | about 8.0 |
| linoleic | about 1.0 |

12. A transparent soap composition consisting of

| | weight percent range |
|---|---|
| (a) triethanolamine | 30-35 |
| (b) coconut fatty acid | 18-22 |
| (c) stearic acid | 15-21 |
| (d) sodium hydroxide | 4.5-6.5 |
| (e) glycerine | 10-16 |
| (f) 50% gluconic acid | about 0.2 |
| (g) sodium metabisulfite | about 0.5 |
| (h) citric acid | about 0.5 |
| (i) perfume | about 1.0 |
| (j) deionized water | balance |

13. The soap composition of claim 12 wherein said (a)-(e) ingredients have the following weight percentage values

| |
|---|
| (a) 30.2 |
| (b) 20.2 |
| (c) 20.2 |
| (d) 4.55 |
| (e) 12.1 |

14. The soap composition of one of claims 12 and 13 in solid bar configuration.

* * * * *